(12) United States Patent
Prabhakaran et al.

(10) Patent No.: US 11,074,267 B2
(45) Date of Patent: Jul. 27, 2021

(54) STAGED APPROACH TO AUTOMATIC DATA DISCOVERY AND PERFORMANCE

(71) Applicant: SAP SE, Walldorf (DE)

(72) Inventors: Amrita Prabhakaran, Bangalore (IN); Srivathsa Gunda Dixit, Bangalore (IN); Poornima Umashankar, Bangalore (IN)

(73) Assignee: SAP SE, Walldorf (DE)

( * ) Notice: Subject to any disclaimer, the term of this patent is extended or adjusted under 35 U.S.C. 154(b) by 502 days.

(21) Appl. No.: 15/463,629

(22) Filed: Mar. 20, 2017

(65) Prior Publication Data
US 2018/0267974 A1 Sep. 20, 2018

(51) Int. Cl.
*G06F 16/25* (2019.01)
*G06F 16/22* (2019.01)

(52) U.S. Cl.
CPC .......... *G06F 16/252* (2019.01); *G06F 16/221* (2019.01)

(58) Field of Classification Search
None
See application file for complete search history.

(56) References Cited

U.S. PATENT DOCUMENTS

| | | | |
|---|---|---|---|
| 6,847,971 B1 * | 1/2005 | Balaraman | H04L 69/04 |
| 7,580,941 B2 | 8/2009 | Kasravi et al. | |
| 7,945,577 B2 | 5/2011 | Altinel et al. | |
| 9,110,939 B2 | 8/2015 | Pfeifle et al. | |
| 9,152,575 B2 | 10/2015 | Burka et al. | |
| 9,176,980 B2 | 11/2015 | Ananthanarayanan et al. | |
| 9,251,199 B2 | 2/2016 | Schiebeler | |
| 9,465,825 B2 | 10/2016 | Nelke et al. | |
| 2008/0082374 A1 * | 4/2008 | Kennis | G06Q 10/06 705/7.36 |

(Continued)

OTHER PUBLICATIONS

Papdomanolakis, Stratos et al. "AutoPart: Automating Schema Design for Large Scientific Databases Using Data Partitioning"; 16th International Conference on Scientific and Statistical Database Management (SSDBM), Santorini Island, Greece. Jun. 21-23, 2004.

*Primary Examiner* — Kevin T Bates
*Assistant Examiner* — Dae Kim
(74) *Attorney, Agent, or Firm* — Fish & Richardson P.C.

(57) ABSTRACT

The disclosure generally describes methods, software, and systems, including a method for caching information. A request for information is received at a staging layer. A determination is made whether the requested information already exists entirely in a cache. In response to determining that the requested information does not exist entirely in the cache, at least some of the requested information from the underlying database layer is retrieved. A completeness level to which the requested information exists in the cache is determined. In response to determining that the requested information exists partially in the cache, cache-nonresident information is retrieved from the underlying database layer and merged with information in the cache. In response to determining that none of the requested information exists in the cache, the request is forwarded to the underlying database layer. The requested information is provided by the staging layer to a presentation layer.

18 Claims, 3 Drawing Sheets

(56) References Cited

U.S. PATENT DOCUMENTS

| | | | |
|---|---|---|---|
| 2010/0185697 A1* | 7/2010 | Lehr | G06F 16/22 |
| | | | 707/803 |
| 2011/0320399 A1 | 12/2011 | Ledwich et al. | |
| 2014/0279931 A1* | 9/2014 | Gupta | G06F 16/27 |
| | | | 707/683 |
| 2014/0281249 A1* | 9/2014 | Waldspurger | G06F 12/0802 |
| | | | 711/129 |
| 2014/0310232 A1* | 10/2014 | Plattner | G06F 16/24539 |
| | | | 707/602 |
| 2015/0254308 A1* | 9/2015 | Scott | G06F 16/23 |
| | | | 707/780 |
| 2016/0085643 A1* | 3/2016 | McAlister | G06F 11/1435 |
| | | | 714/4.12 |
| 2017/0076113 A1* | 3/2017 | McNamara | G06F 21/6245 |
| 2017/0366637 A1* | 12/2017 | Bandyopadhyay | |
| | | | H04L 67/2842 |
| 2018/0063076 A1* | 3/2018 | Field | H04L 67/2804 |
| 2018/0129816 A1* | 5/2018 | Schmidt | G06F 21/6218 |
| 2018/0239796 A1* | 8/2018 | Song | G06F 16/9024 |

* cited by examiner

STAGED APPROACH TO AUTOMATIC DATA DISCOVERY AND PERFORMANCE

BACKGROUND

The present disclosure relates to data access and caching. For example, the data may support business platforms that use various analytical tools, such as self-service, dash boarding, or ad-hoc analysis. Data usage can increase over time, causing a potential slow-down in clients that consume the data. This can require recalibration and/or resizing of both clients and databases for performance issues. Corresponding dependencies between database expertise and performance optimization can increase total cost of ownership (TCO) for entities that use the data.

A company's need for accessing data and creating documents can generally converge on particular segments of data that are important for analysis, ultimately resulting in a pattern of data access.

SUMMARY

This disclosure generally describes computer-implemented methods, software, and systems for caching information. One computer-implemented method includes: receiving, at a staging layer and from a presentation layer, a request for information; determining whether the requested information already exists entirely in a cache associated with the staging layer, the cache storing a subset of information obtained from an underlying database layer; in response to determining that the requested information exists entirely in the cache, extracting the requested information from the cache; in response to determining that the requested information does not exist entirely in the cache, retrieving at least some of the requested information from the underlying database layer, including: determining a completeness level to which the requested information exists in the cache; in response to determining that the requested information exists partially in the cache, retrieving, from the underlying database layer, cache-nonresident information, and merging the retrieved cache-nonresident information with information in the cache; and in response to determining that none of the requested information exists in the cache, forwarding the request to the underlying database layer, receiving the cache-nonresident information from the underlying database layer, and caching the cache-nonresident information; and providing, by the staging layer to the presentation layer, the requested information.

The foregoing and other implementations can each optionally include one or more of the following features, alone or in combination. In particular, one implementation can include all the following features:

In a first aspect, combinable with any of the previous aspects, the request for information is a request for a dataset that includes one or more databases or data tables, wherein each database or data table includes a plurality of records or rows, and wherein each record or row comprises a plurality of fields or columns.

In a second aspect, combinable with any of the previous aspects, retrieving the requested information further includes, for information accessed from the underlying database layer and in response to the request: configuring the cache to receive, from the underlying database layer, one or more push notifications for information accessed in the underlying database layer; and in response to receiving the one or more push notifications, updating the cache with the information accessed from the underlying database layer.

In a third aspect, combinable with any of the previous aspects, the method further comprises further comprising maintaining a dataset registry identifying datasets resident at the staging layer, including updating the dataset registry when new data from the underlying database layer is cached in the staging layer.

In a fourth aspect, combinable with any of the previous aspects, the dataset registry includes, for each dataset, an identifier of the dataset, a reference pointer to database tables in the underlying database layer from which the dataset is cached, field names of fields that are included in the dataset, a count of queries against the dataset, and a list of aggregate functions performed on the dataset.

In a fifth aspect, combinable with any of the previous aspects, determining the completeness level to which the requested information exists in the cache includes determining whether requested information exists in the dataset registry.

In a sixth aspect, combinable with any of the previous aspects, the method further comprises periodically updating the cache with updated information from the underlying database layer, including configuring the cache to receive, from the underlying database layer, one or more push notifications for synching cached information in the cache based on updated information in the underlying database layer; and in response to receiving the one or more push notifications at the staging layer from the underlying database layer, updating the cache with the updated information from the underlying database layer.

In a seventh aspect, combinable with any of the previous aspects, the method further comprises purging information from the cache that has not been accessed for a threshold period of time.

In an eighth aspect, combinable with any of the previous aspects, the request for information in a dataset includes a request for information from a plurality of fields, records, and databases.

In a ninth aspect, combinable with any of the previous aspects, the underlying database layer includes multiple data sources, databases and tables.

In a tenth aspect, combinable with any of the previous aspects, the method further comprises updating a transaction table indicating that the request for information has occurred.

The details of one or more implementations of the subject matter of this specification are set forth in the accompanying drawings and the description below. Other features, aspects, and advantages of the subject matter will become apparent from the description, the drawings, and the claims.

DETAILED DESCRIPTION

Figure 1:
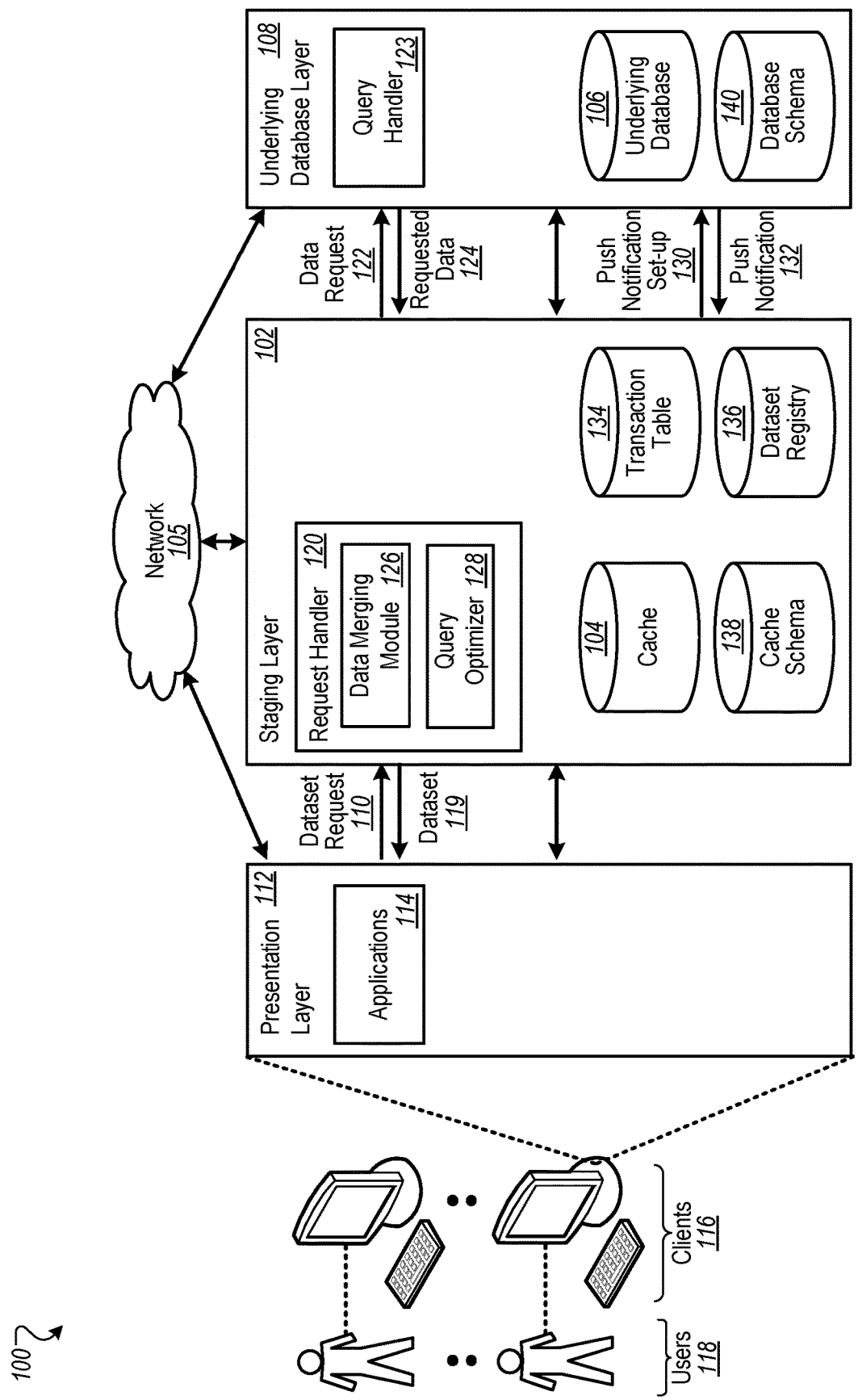
FIG. 1 is a block diagram of an example environment for providing data through a staging layer that includes a cache.

This disclosure generally describes computer-implemented methods, software, and systems for caching information. A request for information is received at a staging layer from a presentation layer. A determination is made whether the requested information already exists entirely in a cache associated with the staging layer. The cache stores a subset of information obtained from an underlying database layer. In response to determining that the requested information exists entirely in the cache, the requested information is extracted from the cache. In response to determining that the requested information does not exist entirely in the cache, at least some of the requested information from the underlying database layer is retrieved. A completeness level to which the requested information exists in the cache is determined. In response to determining that the requested information exists partially in the cache, cache-nonresident information is retrieved from the underlying database layer, and the retrieved cache-nonresident information is merged with information in the cache. In response to determining that none of the requested information exists in the cache, the request is forwarded to the underlying database layer, the cache-nonresident information is received from the underlying database layer, and the cache-nonresident information is cached. The requested information is provided by the staging layer to the presentation layer.

The subject matter described in this specification can be implemented in particular implementations so as to realize one or more of the following advantages. End users can benefit from improved performance and automated insights based on data usage. The importance of individual columns and column members can be established. The overall usability of a product can be improved.

Knowing a pattern of data access and providing corresponding technical solutions can significantly improve the usability of products associated with the data. The usage pattern of underlying database columns/values can vary by different clients, and this can yield significant insights useful for document creation. For example, the chief information officer (CIO) of an organization may require that schedules reach intended recipients correctly at the time of schedule. In another example, activities such as refreshing of documents, drilldown functions, filtering, and other functions that happen every day are expected to happen quickly to meet business needs. Departmental solutions may more or less revolve around particular dedicated data stores, including, for example, using various drivers to access similar data fields used in reports. At database design time, a database designer may not know the importance of different fields and values that users may access in their reports.

In some implementations, in order to provide solutions that effectively cache data, a two-part solution approach can be used. In a first part of the solution, as the clients use different columns and values in a data store, whether as they relate to user-generated queries, dashboards, or other ongoing requests or data access, a usage pattern can be established that it is light weight and can cater requirements of analytical tools. In a second part of the solution, databases can have or acquire intelligence needed for catering to analytical needs. In some implementations, the solution can include the use of a staging layer that accesses (and exploits usage patterns for) a cache of data obtained from an underlying database layer.

In the first part of the solution, a usage pattern can be established based on use by various clients of different columns/values in the data store, with the following points in mind. Consider a business intelligence (BI) client using particular dimensions, dimension values, and measures over a period of time. Information about the use of the data by the BI client can be used to create a built-in schema-like structure which can identify and access delta changes from databases and stores delta information. This schema-like structure can provide only the latest data to the affected columns in the report. If there is an addition of a column in the database, a user can edit the document to add the column. The underlying schema can be updated accordingly.

As an example, a field executive may always be interested in seeing business information related to Country A (e.g., based on an analysis of the field executive's standard views, the role of field executive, or other criteria). As such, the field executive may create a filter on Country A, and the filter may also be used, for example, to capture sales revenue for State B in Country A. The schema that is built to support this filter can include country, state and sales revenue as the columns and can be configured to incorporate delta changes to the data. Whenever the user refreshes the report, only delta information is updated in the report.

The schema that gets generated in this example can also understand the relationship between the columns and column values, thereby establishing a pattern. For example, a pattern can be established by which the field executive sees that City C always gets highest sales revenue compared to other cities, from which business sales decisions can be made. An intelligence can be established within the staging layer that is based on pre-calculated algorithms such as association rules and dependency analysis. Using this intelligence, once this pattern is established at different clients and extended for different clients in the BI portfolio, this can potentially provide useful insights while the document is being created or refreshed.

In the second part of the solution, databases and/or database layers can include intelligence needed for cater to analytical needs. For example, databases can be configured to identify and understand the most-used columns from the schema-like structure created above. Using that information, a trigger can be sent from the databases to the schema to update the delta changes so that schema is always up-to-date. Based on a frequency of reads and writes on the data, databases can be optimized to provide the requested data quickly and effectively, sometimes prior to the updated data being requested by the associated user.

When both parts of the solution are in place, multiple problems identified above can be addressed. For example, a company's different departments, such as human resources, finance, and sales, may store their data in one or more databases. Each of the departments may have different information areas, and there can be many cube queries created for different reporting purposes. Different BI tools consuming data for their individual needs can create reports based on each department's needs. Over time, as data usage increases at different client levels and at the consolidated level, a pattern of data use can be established.

In some implementations, clients' access data can go through a light-weight staging layer. The staging layer can initially be established to have the same schema as an underlying database layer's schema structure. Over time, as usage of the data increases, a list of most-used tables, columns, aggregations, associations, and filters can be determined and maintained. The usage information can be used to create a schema in the staging layer that most represents the needs of the users. Once the schema in the staging layer is established, whenever the data in the underlying database is updated, delta changes can be pushed by the underlying database layer to the staging layer. On occasions in which the user tries to access some section of data that is not available on the staging layer, the staging layer can retrieve the extra information from the underlying database layer, join the retrieved information to already available data, and then provide it to the clients.

The schema of the staging layer can be maintained on the same database as the rest of data or on a separate database, as appropriate. For example, storage of the schema needs to support analytical requirements such as hierarchy support, drill-down analysis, filtering, prompting, input controls, mapping, visualizations, and faster reports.

In some implementations, the staging layer can also provide predictive functions such as associative analysis, cluster analysis, and other analytical operations. Based on information that is collected regarding most-used tables and columns, for example, BI clients can use functions of the staging layer to provide users with most likely-used charts, possible outliers in the data, and other data analysis.

In some implementations, performance enhancement algorithms can be used. For example, say there is a set of data in the database on which analytical queries are run. Further assume that there are n number of dimensions $D_1 \ldots D_n$ (such as textual fields) and m number of measures $M_1 \ldots M_m$ (such as numeric fields), all of which are fields (or columns) in the database. Note that in case of measures, the aggregation of the measure can be considered when designing performance enhancement algorithms. In the following algorithm, it is assumed that a measure $M_1=M_2$ only if both aggregation and the field are same. Client query for data only through the automatic staging layer, and not directly to the database. As such, the staging layer can be configured to maintain, for each dataset, the following transaction table (initially shown empty):

TABLE 1

Empty Transaction Table

| Query ID | Field |
| --- | --- |

When a query is fired on a dataset, for example, the staging layer can check the cache for the existence of the dataset. If the dataset does not have any data, the query can be forwarded to the database directly. A response cube for the query can be cached in the query optimizer and the query optimizer can set up a push notification with the database to inform the staging layer of changes to data in the dataset. The query optimizer can also update a transaction table with information on the dimensions and measures used. If k dimensions and l measures are queried for Query 1, for example, the table will be updated as below.

TABLE 2

Transaction Table Showing a Transaction

| Query ID | Field |
| --- | --- |
| 1 | $D_1$ |
| 1 | $D_2$ |
| 1 | $\ldots D_k$ |
| 1 | $M_1$ |
| 1 | $M_2$ |
| 1 | $\ldots M_l$ |

Another table containing cached dataset information can be maintained, such as in a dataset registry, and can include information such as included in Table 3.

TABLE 3

Dataset Registry Identifying Cached Information

| Cache Dataset ID | DB reference pointer | Dimensions and measures used | Query Count | Analytical action performed |
| --- | --- | --- | --- | --- |

In Table 3, a "Cache Dataset ID" column refers to the identifier of the dataset in the cache, a "DB Reference Pointer" column provides information of the DB and query on the original database that was used to create the dataset, a "Dimensions and Measures Used" column contains a list of dimensions and measures from original table that is present in this dataset, a "Query Count" column provides a count of the number of time this dataset has been referenced by clients, and an "Analytical Action Performed" column can identify aggregate functions used using values such as sort, rank, filter, etc.

Various situations exist in which at least some data already exists in the cache. For example, if a client request is for the exact same set of data as previously requested, then the query optimizer of the staging layer can return the existing dataset. In another example, the client request may be for a subset of a dataset that is already in the cache. This can happen, for example, through filters or drill-down, drill-up, ranking, lesser number of measures or dimensions, or some other analytical operation on the same set of data in the dataset. In this case, a response to the client request can be determined from the dataset by the staging layer without having to query the complete database in the underlying database layer.

In another example, if a client request is for a set of data that is completely different from (or intersects with only a part of) existing data in the dataset, the new data has to be retrieved from the database and a push notification set up with the database. If the dataset can be merged with the existing dataset in the cache, then merging can be done. If not, a separate dataset can be set up and maintained.

In some implementations, when creating separate datasets (and deciding when to create subsequent separate datasets and perform other operations), thresholds can be maintained, such as an n/2 threshold, where n is the number of existing dimensions in a dataset. Using this threshold, for example, if the sum of the number of dimensions that are cached exceeds n/2, then the transaction table and dataset information table can be used to determine a least-used dimension that can be removed or modified respectively. Similar or different thresholds can be calculated and applied for measures also.

In some implementations, merging of datasets can occur under some circumstances. For example, if a user is requesting a new measure but grouped on same set of dimensions that are present in the dataset than a set of data that is completely different or intersects with existing dataset, then the data can be retrieved and merged with the existing dataset.

If the user is requesting a new measure with an associative aggregation, such as a SUM, MAX, or MIN aggregation on a subset of the data, then while querying the database, the staging layer can query for all the dimensions both in the cache and the user query. The resulting dataset can be merged with existing one, and the optimizer can perform a second aggregation step with lesser dimensions to return to user. For non-associative aggregations, such as AVG, COUNT, and DISTINCT COUNT, merging of datasets may not be able to be done.

In some implementations, further optimizations can be performed, such as if the transaction table builds up. In this case, the transaction table can act as an input to association analysis predictive algorithms, such as to provide insights on which dimensions and measures are most used together. This analysis can be used as input in logic for deciding which dimensions or measures need to be removed from cache and which are to be retained. The analysis can also help in deciding the kinds of queries that the staging layer can fire to the actual database to predict the user's next query, such as to pre-fetch the data along with current query. The analysis can also be used by clients to provide suggestions to users on most interesting visualizations on the dataset.

FIG. 1 is a block diagram of an example environment 100 for providing data through a staging layer that includes a cache. For example, the environment 100 includes a staging layer 102 that includes (or can access) a cache 104. The cache 104 contains a subset of data from an underlying database 106 stored at (or accessed by) an underlying database layer 108. The underlying database 106 can include, for example, information from multiple data sources, databases, and tables. The cache 104 can include, for example, data that has been previously requested from the underlying database layer 108. In some implementations, a network 105 can support requests, data, and communications between elements of the environment 100.

The staging layer 102 can receive dataset requests 110, for example, from a presentation layer 112 that includes applications 114. The presentation layer 112 can be implemented on (or available through) one or more clients 116 used by users 118. The applications 114, for example, can include frontends and various graphical user interfaces used by the users 118 to generate or request reports, perform queries on databases, and other functions that may require data from databases cached at (or available through) the staging layer 102. The staging layer 102 can also support other applications, such as background and batch processing jobs that do not require input from a user. In response to each dataset request 110, the staging layer 102 can provide a dataset 119.

The staging layer 102 includes a request handler 120 that, upon receipt of the dataset request 110, handles the request. Handling the request includes determining whether the requested data is resident in the cache 104 or is to be retrieved, in whole or in part, from other sources, including the underlying database layer 108. If the requested dataset resides entirely in the cache 104, then the request handler 120 can obtain the dataset from the cache 104 and return the dataset 119 to the presentation layer 112 in response to the request.

Situations can occur in which the requested dataset resides partially in the cache 104, such as if only a subset of the columns/fields that are requested are cached. In this case, the request handler 120 can obtain the subset of the columns/fields from the cache 104 and create a data request 122 for the remaining data. The data request 122 can be sent, for example, to the underlying database layer 108 for retrieval of the columns/fields not in the cache 104 (but resident in the underlying database 106). In some implementations, a query handler 123 that is included in the underlying database layer 108 can handle data requests 122. Upon receipt, from the underlying database layer 108, of requested data 124 matching the data request 122, a data merging module 142 can merge the requested data 124 with the subset of the columns/fields obtained from the cache 104 to produce the dataset 119. In some implementations, data requests 122 can be sent to other destinations that are sources of data instead of, or in addition to, the underlying database layer 108.

In situations in which the requested dataset is completely absent from the cache 104, such as if none of the requested columns/fields are cached, then the request handler 120 can create the data request 122 to be sent to the underlying database layer 108 for the columns/fields representative of the dataset request 110. After the requested data 124 matching the data request 122 is received from the underlying database layer 108, the request handler 120 can produce the dataset 119 entirely from the requested data 124.

In some implementations, the request handler 120 includes a data merging module 126 that merges information from the cache 104 with information obtained from the underlying database 106. The data merging module 126 can also merge information from the cache 104 with other information in the cache 104 (such as in a join operation).

The request handler 120 can include a query optimizer 128 for optimizing queries, such as dataset requests 110 that are received. For example, if the dataset request 110 is for an exact same set of data previously requested (and currently resident in the cache 104), then the query optimizer 128 can return the existing dataset. The query optimizer 128 can perform other functions, such as caching response cubes for specific queries. In order to keep the cache 104 current with data that may be re-requested, for example, the query optimizer 128 can provide push notification set-ups 130 to the underlying database layer 108, such as to request that the underlying database 106 inform the staging layer 102 of changes to data in the dataset, through a push notification 132. An example of the push notification set-up 130 can be along the lines of "Inform of (and provide data updates for) additions, modifications, and/or deletions to rows and/or columns in database X."

The query optimizer 128 can also maintain a transaction table 134, such as to include information similar or in addition to information in Table 2 described above. Entries in the transaction table 134 can identify, for example, k dimensions and l measures that were queried (e.g., as part of the dataset request 110). In some implementations, timestamp information can be included, such as to purge the transaction table 134 of entries older than a threshold age, or to determine when updated data is to be obtained (e.g., when a periodic updates of data are used). Other information can be stored, such as to help in identifying most commonly used columns or for other reasons.

The staging layer 102 can include and maintain a dataset registry 136 for identifying datasets that are resident in the cache 104. For example, the dataset registry 136 can include information described above with regard to Table 3. Specifically, the information can include cached dataset identifiers, database reference pointers, dimensions and measures used (e.g., columns), counts of the number of queries against the dataset, and analytical actions performed, such as aggregation functions. Other information can be stored as needed, such as including information associated with push notifications corresponding to particular datasets.

The staging layer 102 can include a cache schema 138 that identifies information for the structure of the cache 104. Initially, the cache schema 138 can have some of the same information as a database schema 140 of the underlying database 106. Over time, as usage of the cache 104 increases, the cache schema 138 can be updated as lists of most-used tables, columns, aggregations, associations, and filters are determined. Once the cache schema 138 is established, and whenever the data in the underlying database 106 is updated, delta changes can be pushed by the underlying database layer 108 to the staging layer 102.

Figure 2:
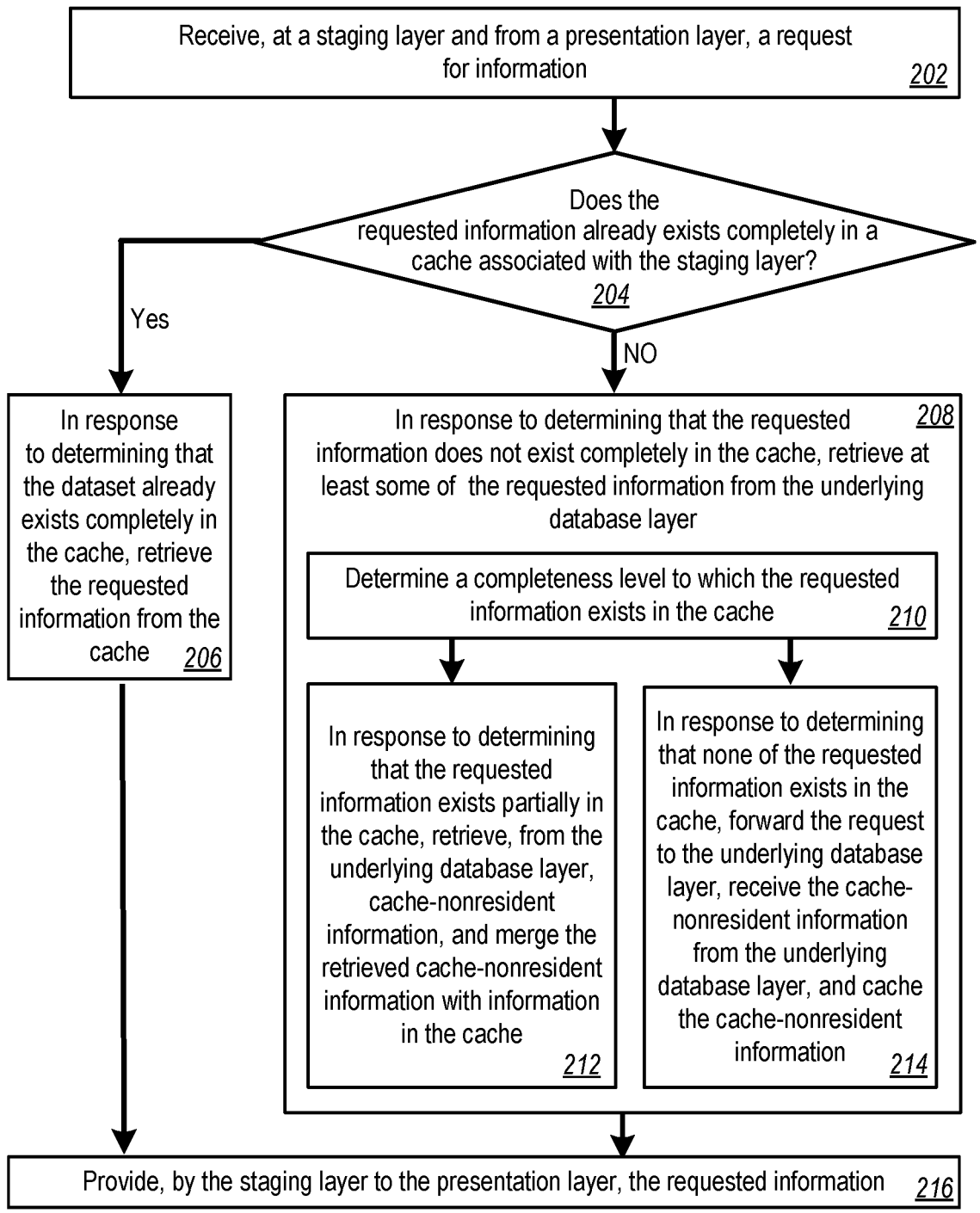
FIG. 2 is a flowchart of an example method for providing data through a staging layer that includes a cache.

FIG. 2 is a flowchart of an example method 200 for providing data through a staging layer that includes a cache. Data handled by the method 200 can include one or more datasets. Each dataset can include one or more databases or data tables, and each database or data table can include one or more records or rows, with each record or row including one or more fields or columns. For clarity of presentation, the description that follows generally describes method 200 in the context of FIG. 1.

At 202, a request for information is received at a staging layer from a presentation layer. For example, the staging layer 102 can receive the dataset request 110, such as a request for a report (or the information contained therein) including employees, grouped and totaled by salary. The report can include fields for each employee that are obtained from database columns such as employee name and address, as well as columns associated with each employee's salary. The staging layer 102 can serve as a layer that receives data requests for data that exists in the underlying database layer 108, with most or all of the data previously (or recently) requested also being present in the cache 104, thus not requiring access to the underlying database 106 to satisfy a majority of the requests. In general, the request for information in a dataset can include a request for information from a plurality of fields, records, and databases.

At 204, a determination is made as to whether the requested information already exists completely in a cache associated with the staging layer, the cache storing a subset of information obtained from an underlying database layer. The request handler 120, for example, can determine if data in the dataset request 110 is entirely resident in the cache 104. In some implementations, determining if a requested dataset exists completely in the cache 104 can include checking the dataset registry 136 for the requested data. The determination can also include determining that the requested columns are resident in the cache 104. In another example, the request handler 120 can determine if the requested information is a subset of information in the cache 104. In some implementations, determining whether the requested information already exists completely in the cache can include determining whether the information included in cache 104 is still valid, e.g., based on age, applied rule set, or by other techniques.

At 206, in response to determining that the dataset already exists completely within the cache, the requested information is provided by the staging layer to the presentation layer. For example, the staging layer 102 can extract the requested information from the cache 104.

At 208, in response to determining that the requested information does not exist completely in the cache, at least some of the requested information is retrieved from the underlying database layer. For example, based on determining that at least part of the requested dataset is identified by the dataset registry 136 as not being resident in the cache 104, the request handler 120 can perform operations to retrieve any cache-nonresident information from the underlying database layer 108.

At 210, a completeness level to which the requested information exists in the cache is determined. For example, the request handler 120 can determine which requested columns are in the cache 104.

At 212, in response to determining that the requested information exists partially in the cache, cache-nonresident information is retrieved from the underlying database layer, and the retrieved cache-nonresident information is merged with information in the cache. For example, if the request handler 120 determines that only some of the employee name, address, and salary information is in the cache 104, the staging layer 102 can use the data request 122 to request the remaining information from the underlying database layer 108. The data request 122 can request, for example, the cache-nonresident information, which is the information not already in the cache 104 when the dataset request 110 is received. The underlying database layer 108 can respond to the data request 122 and produce the requested data 124, which the data merging module 126 can merge with the information already in the cache 104.

At 214, in response to determining that none of the requested information exists in the cache, the request is forwarded to the underlying database layer, the cache-nonresident information is received from the underlying database layer, and the cache-nonresident information is cached. For example, if the request handler 120 determines that none of the information for the employee name, address, and salary information is in the cache 104, the staging layer 102 can use the data request 122 to request all of the information from the underlying database layer 108.

At 216, the requested information is provided by the staging layer to the presentation layer. For example, the staging layer 102 can provide the dataset 119 to the presentation layer, such as including the requested employee name, address, and salary information.

In some implementations, the method 200 can further include operations for setting up push notifications as an extra aspect of retrieving the requested information and for keeping the information up-to-date. For example, for information accessed from the underlying database layer 108, and in response to the dataset request 110, the staging layer 102 can configure the cache 104 to receive, from the underlying database layer, one or more push notifications for information accessed from the underlying database layer. Setting up for receipt of the push notifications 132, for example, can be made by providing push notification set-ups 130 to the underlying database layer 108. In response to receiving the one or more push notifications 132, for example, the staging layer 102 can update the cache 104 with the information accessed from the underlying database layer 108. This can include, for example, any employee name, address, and salary information that is missing from the cache 104 when the dataset request 110 is received.

In some implementations, the method 200 can further include maintaining the dataset registry 136, for example, identifying datasets resident in the cache 104 at the staging layer 102. For each dataset residing at the staging layer 102, for example, the dataset registry 136 can include at least the elements described above with reference to Table 3. The elements can include, for example, an identifier of the dataset, a reference pointer to database tables in the underlying database layer from which the dataset is cached, field names of fields that are included in the dataset, a count of queries against the dataset, and a list of aggregate functions performed on the dataset, such as sort, rank, filter, etc.

In some implementations, determining the completeness level to which the requested information exists in the cache includes determining whether requested information exists in the dataset registry. For example, the request handler 120 can check the dataset registry 136 to determine if the dataset and fields identified by the dataset request 110 are in the cache 104.

In some implementations, the method 200 can further include purging datasets from the cache that have not been accessed for a threshold period of time. For example, if timestamps maintained for entries in the transaction table 134 indicate that the time since the last query against a particular dataset exceeds a threshold, then the particular dataset can be removed from the cache 104.

In some implementations, the method 200 can further include updating a transaction table indicating that the request for information has occurred. For example, the request handler 120 can increment a count of a number of times that the dataset request 110 has been received, such is in a table similar to Table 3.

Figure 3:
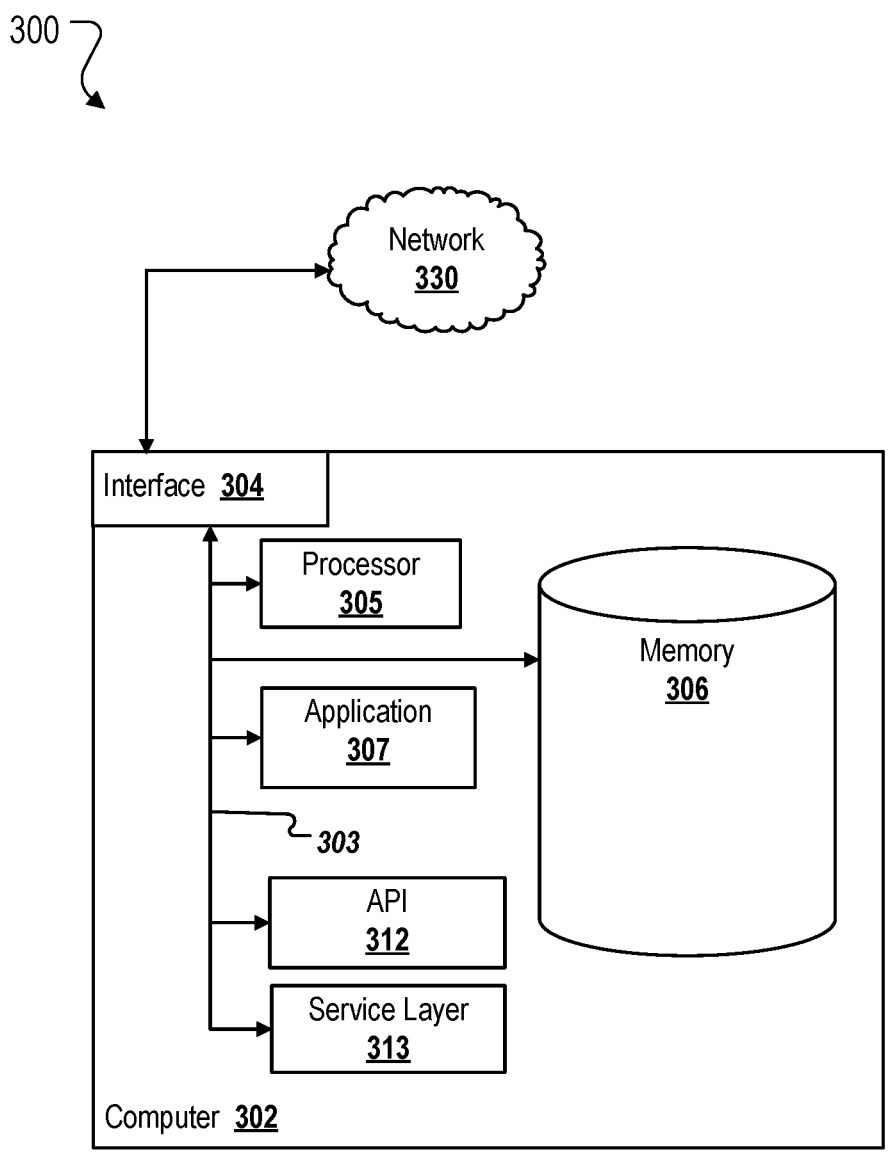
FIG. 3 is a block diagram of an exemplary computer system used to provide computational functionalities associated with described algorithms, methods, functions, processes, flows, and procedures as described in the instant disclosure.

FIG. 3 is a block diagram of an exemplary computer system 300 used to provide computational functionalities associated with described algorithms, methods, functions, processes, flows, and procedures as described in the instant disclosure.

The illustrated computer 302 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 302 may comprise a computer that includes an input device, such as a keypad, keyboard, touch screen, or other device that can accept user information, and an output device that conveys information associated with the operation of the computer 302, including digital data, visual, or audio information (or a combination of information), or a GUI.

The computer 302 can serve in a role as a client, network component, a server, a database or other persistency, or any other component (or a combination of roles) of a computer system for performing the subject matter described in the instant disclosure. The illustrated computer 302 is communicably coupled with a network 330. In some implementations, one or more components of the computer 302 may be configured to operate within environments, including cloud-computing-based, local, global, or other environment (or a combination of environments).

At a high level, the computer 302 is an electronic computing device operable to receive, transmit, process, store, or manage data and information associated with the described subject matter. According to some implementations, the computer 302 may also include or be communicably coupled with an application server, e-mail server, web server, caching server, streaming data server, business intelligence (BI) server, or other server (or a combination of servers).

The computer 302 can receive requests over network 330 from a client application (for example, executing on another computer 302) and responding to the received requests by processing the said requests in an appropriate software application. In addition, requests may also be sent to the computer 302 from internal users (for example, from a command console or by other appropriate access method), external or third-parties, other automated applications, as well as any other appropriate entities, individuals, systems, or computers.

Each of the components of the computer 302 can communicate using a system bus 303. In some implementations, any or all of the components of the computer 302, both hardware or software (or a combination of hardware and software), may interface with each other or the interface 304 (or a combination of both) over the system bus 303 using an application programming interface (API) 312 or a service layer 313 (or a combination of the API 312 and service layer 313). The API 312 may include specifications for routines, data structures, and object classes. The API 312 may be either computer-language independent or dependent and refer to a complete interface, a single function, or even a set of APIs. The service layer 313 provides software services to the computer 302 or other components (whether or not illustrated) that are communicably coupled to the computer 302. The functionality of the computer 302 may be accessible for all service consumers using this service layer. Software services, such as those provided by the service layer 313, provide reusable, defined business functionalities through a defined interface. For example, the interface may be software written in JAVA, C++, or other suitable language providing data in extensible markup language (XML) format or other suitable format. While illustrated as an integrated component of the computer 302, alternative implementations may illustrate the API 312 or the service layer 313 as stand-alone components in relation to other components of the computer 302 or other components (whether or not illustrated) that are communicably coupled to the computer 302. Moreover, any or all parts of the API 312 or the service layer 313 may be implemented as child or sub-modules of another software module, enterprise application, or hardware module without departing from the scope of the instant disclosure.

The computer 302 includes an interface 304. Although illustrated as a single interface 304 in FIG. 3, two or more interfaces 304 may be used according to particular needs, desires, or particular implementations of the computer 302. The interface 304 is used by the computer 302 for communicating with other systems in a distributed environment that are connected to the network 330 (whether illustrated or not). Generally, the interface 304 comprises logic encoded in software or hardware (or a combination of software and hardware) and operable to communicate with the network 330. More specifically, the interface 304 may comprise software supporting one or more communication protocols associated with communications such that the network 330 or interface's hardware is operable to communicate physical signals within and outside of the illustrated computer 302.

The computer 302 includes a processor 305. Although illustrated as a single processor 305 in FIG. 3, two or more processors may be used according to particular needs, desires, or particular implementations of the computer 302. Generally, the processor 305 executes instructions and manipulates data to perform the operations of the computer 302 and any algorithms, methods, functions, processes, flows, and procedures as described in the instant disclosure.

The computer 302 also includes a memory 306 that holds data for the computer 302 or other components (or a combination of both) that can be connected to the network 330 (whether illustrated or not). For example, memory 306 can be a database storing data consistent with this disclosure. Although illustrated as a single memory 306 in FIG. 3, two or more memories may be used according to particular needs, desires, or particular implementations of the computer 302 and the described functionality. While memory 306 is illustrated as an integral component of the computer 302, in alternative implementations, memory 306 can be external to the computer 302.

The application 307 is an algorithmic software engine providing functionality according to particular needs, desires, or particular implementations of the computer 302, particularly with respect to functionality described in this disclosure. For example, application 307 can serve as one or more components, modules, applications, etc. Further, although illustrated as a single application 307, the application 307 may be implemented as multiple applications 307 on the computer 302. In addition, although illustrated as integral to the computer 302, in alternative implementations, the application 307 can be external to the computer 302.

There may be any number of computers 302 associated with, or external to, a computer system containing computer 302, each computer 302 communicating over network 330. Further, the term "client," "user," and other appropriate terminology may be used interchangeably as appropriate without departing from the scope of this disclosure. Moreover, this disclosure contemplates that many users may use one computer 302, or that one user may use multiple computers 302.

In some implementations, components of the environments and systems described above may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, components may be adapted to execute any operating system, including Linux, UNIX, Windows, Mac OS®, Java™, Android™, iOS or any other suitable operating system. According to some implementations, components may also include, or be communicably coupled with, an e-mail server, a web server, a caching server, a streaming data server, and/or other suitable server(s).

Processors used in the environments and systems described above may be a central processing unit (CPU), an application specific integrated circuit (ASIC), a field-programmable gate array (FPGA), or another suitable component. Generally, each processor can execute instructions and manipulates data to perform the operations of various components. Specifically, each processor can execute the functionality required to send requests and/or data to components of the environment and to receive data from the components of the environment, such as in communication between the external, intermediary and target devices.

Components, environments and systems described above may include a memory or multiple memories. Memory may include any type of memory or database module and may take the form of volatile and/or non-volatile memory including, without limitation, magnetic media, optical media, random access memory (RAM), read-only memory (ROM), removable media, or any other suitable local or remote memory component. The memory may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, for references thereto associated with the purposes of the target, intermediary and external devices. Other components within the memory are possible.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, Visual Basic, assembler, Perl®, any suitable version of 4GL, as well as others. Software may instead include a number of sub-modules, third-party services, components, libraries, and such, as appropriate. Conversely, the features and functionality of various components can be combined into single components as appropriate.

Devices can encompass any computing device such as a smart phone, tablet computing device, PDA, desktop computer, laptop/notebook computer, wireless data port, one or more processors within these devices, or any other suitable processing device. For example, a device may comprise a computer that includes an input device, such as a keypad, touch screen, or other device that can accept user information, and an output device that conveys information associated with components of the environments and systems described above, including digital data, visual information, or a graphical user interface (GUI). The GUI interfaces with at least a portion of the environments and systems described above for any suitable purpose, including generating a visual representation of a web browser.

The preceding figures and accompanying description illustrate example processes and computer implementable techniques. The environments and systems described above (or their software or other components) may contemplate using, implementing, or executing any suitable technique for performing these and other tasks. It will be understood that these processes are for illustration purposes only and that the described or similar techniques may be performed at any appropriate time, including concurrently, individually, in parallel, and/or in combination. In addition, many of the operations in these processes may take place simultaneously, concurrently, in parallel, and/or in different orders than as shown. Moreover, processes may have additional operations, fewer operations, and/or different operations, so long as the methods remain appropriate.

In other words, although this disclosure has been described in terms of certain implementations and generally associated methods, alterations and permutations of these implementations, and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A computer-implemented method comprising:
   receiving, at a staging layer and from a presentation layer, a request for information, wherein the staging layer comprises a plurality of cached datasets and a dataset registry identifying datasets resident at the staging layer, wherein each dataset of the plurality of cached datasets comprises one or more data tables, wherein the dataset registry comprises, for each dataset in the staging layer, a reference pointer to database tables in an underlying database layer from which the dataset is cached, and wherein the dataset registry is separate from the datasets;
   determining, by checking the dataset registry, whether the requested information already exists entirely in a cache associated with the staging layer, the cache storing a subset of information obtained from the underlying database layer;
   in response to determining, based on the dataset registry, that the requested information exists entirely in the cache, extracting the requested information from the cache;
   in response to determining, based on the dataset registry, that the requested information does not exist entirely in the cache, retrieving at least some of the requested information from the underlying database layer, including:

determining a completeness level to which the requested information exists in the cache;

in response to determining that the requested information exists partially in the cache, retrieving, from the underlying database layer, cache-nonresident information, and merging the retrieved cache-nonresident information with information in the cache; and in response to determining that none of the requested information exists in the cache, forwarding the request to the underlying database layer, receiving the cache-nonresident information from the underlying database layer, and caching the cache-nonresident information;

providing, by the staging layer to the presentation layer, the requested information; and maintaining the dataset registry, including updating the dataset registry when new data from the underlying database layer is cached in the staging layer.

2. The computer-implemented method of claim 1, wherein the request for information is a request for a dataset that includes one or more databases or data tables, wherein each database or data table includes a plurality of records or rows, and wherein each record or row comprises a plurality of fields or columns.

3. The computer-implemented method of claim 1, wherein retrieving the requested information further includes, for information accessed from the underlying database layer and in response to the request:

configuring the cache to receive, from the underlying database layer, one or more push notifications for information accessed in the underlying database layer; and in response to receiving the one or more push notifications, updating the cache with the information accessed from the underlying database layer.

4. The computer-implemented method of claim 1, wherein the dataset registry includes, for each dataset, an identifier of the dataset, field names of fields that are included in the dataset, a count of queries against the dataset, and a list of aggregate functions performed on the dataset.

5. The computer-implemented method of claim 1, wherein determining the completeness level to which the requested information exists in the cache includes determining whether requested information exists in the dataset registry.

6. The computer-implemented method of claim 1, further comprising periodically updating the cache with updated information from the underlying database layer, including:

configuring the cache to receive, from the underlying database layer, one or more push notifications for synching cached information in the cache based on updated information in the underlying database layer; and in response to receiving the one or more push notifications at the staging layer from the underlying database layer, updating the cache with the updated information from the underlying database layer.

7. The computer-implemented method of claim 1, further comprising purging information from the cache that has not been accessed for a threshold period of time.

8. The computer-implemented method of claim 1, wherein the request for information in a dataset includes a request for information from a plurality of fields, records, and databases.

9. The computer-implemented method of claim 1, wherein the underlying database layer includes multiple data sources, databases and tables.

10. The computer-implemented method of claim 1, further comprising updating a transaction table indicating that the request for information has occurred.

11. A system comprising:
memory storing:
a cache containing a plurality of datasets storing a subset of data from an underlying database layer;
a transaction table identifying dimensions and measures that have been queried from the cache;
a dataset registry identifying datasets that are resident in the cache, wherein the dataset registry is separate from the datasets, and wherein the dataset registry comprises, for each dataset in the staging layer, a reference pointer to database tables in the underlying database layer from which the dataset is cached;
a cache schema identifying structure information for the cache; and
a database schema identifying structure information for the underlying database; and
a server performing operations comprising:
receiving, at a staging layer and from a presentation layer, a request for information;
determining, by checking the dataset registry, whether the requested information already exists entirely in a cache associated with the staging layer, the cache storing a subset of information obtained from the underlying database layer;
in response to determining, based on the dataset registry, that the requested information exists entirely in the cache, extracting the requested information from the cache;
in response to determining, based on the dataset registry, that the requested information does not exist entirely in the cache, retrieving at least some of the requested information from the underlying database layer, including:
determining a completeness level to which the requested information exists in the cache;
in response to determining that the requested information exists partially in the cache, retrieving, from the underlying database layer, cache-nonresident information, and merging the retrieved cache-nonresident information with information in the cache; and
in response to determining that none of the requested information exists in the cache, forwarding the request to the underlying database layer, receiving the cache-nonresident information from the underlying database layer, and caching the cache-nonresident information;
providing, by the staging layer to the presentation layer, the requested information; and
maintaining the dataset registry, including updating the dataset registry when new data from the underlying database layer is cached in the staging layer.

12. The system of claim 11, wherein the request for information is a request for a dataset that includes one or more databases or data tables, wherein each database or data table includes a plurality of records or rows, and wherein each record or row comprises a plurality of fields or columns.

13. The system of claim 11, wherein retrieving the requested information further includes, for information accessed from the underlying database layer and in response to the request:

configuring the cache to receive, from the underlying database layer, one or more push notifications for information accessed in the underlying database layer; and in response to receiving the one or more push notifications, updating the cache with the information accessed from the underlying database layer.

14. The system of claim 11, wherein the dataset registry includes, for each dataset, an identifier of the dataset, field names of fields that are included in the dataset, a count of queries against the dataset, and a list of aggregate functions performed on the dataset.

15. A non-transitory computer-readable media encoded with a computer program, the program comprising instructions that when executed by one or more computers cause the one or more computers to perform operations comprising:

receiving, at a staging layer and from a presentation layer, a request for information, wherein the staging layer comprises a plurality of cached datasets and a dataset registry identifying datasets resident at the staging layer, wherein each dataset of the plurality of cached datasets comprises one or more data tables, wherein the dataset registry comprises, for each dataset in the staging layer, a reference pointer to database tables in an underlying database layer from which the dataset is cached, and wherein the dataset registry is separate from the datasets;

determining, by checking the dataset registry, whether the requested information already exists entirely in a cache associated with the staging layer, the cache storing a subset of information obtained from the underlying database layer;

in response to determining, based on the dataset registry, that the requested information exists entirely in the cache, extracting the requested information from the cache;

in response to determining, based on the dataset registry, that the requested information does not exist entirely in the cache, retrieving at least some of the requested information from the underlying database layer, including:

determining a completeness level to which the requested information exists in the cache;

in response to determining that the requested information exists partially in the cache, retrieving, from the underlying database layer, cache-nonresident information, and merging the retrieved cache-nonresident information with information in the cache; and in response to determining that none of the requested information exists in the cache, forwarding the request to the underlying database layer, receiving the cache-nonresident information from the underlying database layer, and caching the cache-nonresident information;

providing, by the staging layer to the presentation layer, the requested information; and maintaining the dataset registry, including updating the dataset registry when new data from the underlying database layer is cached in the staging layer.

16. The non-transitory computer-readable media of claim 15, wherein the request for information is a request for a dataset that includes one or more databases or data tables, wherein each database or data table includes a plurality of records or rows, and wherein each record or row comprises a plurality of fields or columns.

17. The non-transitory computer-readable media of claim 15, wherein retrieving the requested information further includes, for information accessed from the underlying database layer and in response to the request:

configuring the cache to receive, from the underlying database layer, one or more push notifications for information accessed in the underlying database layer; and in response to receiving the one or more push notifications, updating the cache with the information accessed from the underlying database layer.

18. The non-transitory computer-readable media of claim 15, wherein the dataset registry includes, for each dataset, an identifier of the dataset, field names of fields that are included in the dataset, a count of queries against the dataset, and a list of aggregate functions performed on the dataset.

* * * * *